US011267052B2

(12) United States Patent
McClelland et al.

(10) Patent No.: US 11,267,052 B2
(45) Date of Patent: *Mar. 8, 2022

(54) ADDITIVE MANUFACTURING APPARATUS AND METHODS

(71) Applicant: RENISHAW PLC, Wotton-under-Edge (GB)

(72) Inventors: Michael Joseph McClelland, Stoke-on-Trent (GB); Ceri Brown, Bristol (GB); Ravi Guttamindapalli Aswathanarayanaswamy, Stone (GB)

(73) Assignee: RENISHAW PLC, Wotton-Under-Edge (GB)

( * ) Notice: Subject to any disclaimer, the term of this patent is extended or adjusted under 35 U.S.C. 154(b) by 0 days.

This patent is subject to a terminal disclaimer.

(21) Appl. No.: 16/677,031

(22) Filed: Nov. 7, 2019

(65) Prior Publication Data
US 2020/0070247 A1 Mar. 5, 2020

Related U.S. Application Data

(63) Continuation of application No. 15/527,676, filed as application No. PCT/GB2015/053484 on Nov. 17, 2015, now Pat. No. 10,500,641.

(30) Foreign Application Priority Data

Nov. 21, 2014 (GB) .................................... 1420717

(51) Int. Cl.
*B22F 12/00* (2021.01)
*B33Y 10/00* (2015.01)
(Continued)

(52) U.S. Cl.
CPC ............ *B22F 12/00* (2021.01); *B29C 64/135* (2017.08); *B29C 64/153* (2017.08); *B33Y 10/00* (2014.12);
(Continued)

(58) Field of Classification Search
CPC ... B29C 64/135; B29C 64/153; B29C 64/393; B22F 12/00; B22F 10/00; B22F 10/10; B33Y 10/00; B33Y 30/00
See application file for complete search history.

(56) References Cited

U.S. PATENT DOCUMENTS 5,155,324 A     10/1992  Deckard et al.
5,855,718 A  *   1/1999  Nguyen ................ B29C 64/124
                                                        156/246

(Continued)

FOREIGN PATENT DOCUMENTS

CN     103846437 A     6/2014
CN     104148636 A    11/2014

(Continued)

OTHER PUBLICATIONS

Antonysamy et al., "Effect of build geometry on ß-grain structure and texture in additive manufacture of Ti—6Al—4V by selective electron beam melting", Material Characterization, 2013, vol. 84, pp. 153-168.

(Continued)

*Primary Examiner* — Matthew W Jellett
(74) *Attorney, Agent, or Firm* — Oliff PLC

(57) ABSTRACT

An additive manufacturing apparatus including a build chamber, build platform lowerable in the chamber so layers of flowable material can successively form across the platform, laser for generating a laser beam, scanning unit for directing the laser beam onto each layer to selectively solidify the material and a processor for controlling the scanning unit. The processor controls the scanning unit directs the laser beam to solidify a selected area of material by advancing the laser beam many times along a scan path. On each pass, the laser beam solidifies spaced apart sections of the scan path, each subsequent pass solidifying sections that are located between sections solidified on a previous (Continued)

pass. The processor controls the scanning unit to direct the laser beam to solidify selected area of material by solidifying sub-millimetre sized sections of non-continuously area and in an order such that consecutively solidified sections are spaced apart.

25 Claims, 5 Drawing Sheets

(51) Int. Cl.
 B33Y 30/00 (2015.01)
 B29C 64/153 (2017.01)
 B29C 64/135 (2017.01)
 B22F 10/10 (2021.01)
(52) U.S. Cl.
 CPC .............. *B33Y 30/00* (2014.12); *B22F 10/10* (2021.01); *Y02P 10/25* (2015.11)

(56) References Cited

U.S. PATENT DOCUMENTS

| | | | |
|---|---|---|---|
| 5,965,079 A * | 10/1999 | Manners | B29C 64/135 264/401 |
| 6,042,774 A | 3/2000 | Wilkening et al. | |
| 6,122,564 A | 9/2000 | Koch et al. | |
| 9,067,360 B2 | 6/2015 | Wehning et al. | |
| 9,597,836 B2 | 3/2017 | Abe et al. | |
| 10,337,335 B2 | 7/2019 | Pavlov et al. | |
| 10,434,572 B2 | 10/2019 | Ljungblad | |
| 10,500,641 B2 | 12/2019 | McClelland et al. | |
| 10,501,863 B2 | 12/2019 | Otake | |
| 10,625,374 B2 | 4/2020 | Schwarze | |
| 2002/0128714 A1 | 9/2002 | Manasas et al. | |
| 2003/0214571 A1 | 11/2003 | Ishikawa et al. | |
| 2004/0094728 A1 | 5/2004 | Herzog et al. | |
| 2005/0142024 A1 | 6/2005 | Herzog | |
| 2008/0080570 A1 | 4/2008 | Murison et al. | |
| 2008/0241392 A1 | 10/2008 | Dimter et al. | |
| 2009/0176007 A1 | 7/2009 | Uckelmann | |
| 2010/0305743 A1 | 12/2010 | Larsson | |
| 2011/0298156 A1 | 12/2011 | Hooper et al. | |
| 2013/0060535 A1 | 3/2013 | Fruth | |
| 2013/0112672 A1 | 5/2013 | Keremes et al. | |
| 2013/0264750 A1 | 10/2013 | Hofacker et al. | |
| 2014/0154088 A1 | 6/2014 | Etter et al. | |
| 2014/0163717 A1 | 6/2014 | Das et al. | |
| 2014/0198365 A1 | 7/2014 | Li et al. | |
| 2014/0263209 A1 | 9/2014 | Burris et al. | |
| 2015/0217367 A1 | 8/2015 | Dickey et al. | |
| 2015/0273622 A1 | 10/2015 | Manabe | |
| 2015/0283762 A1 | 10/2015 | Maeda et al. | |
| 2016/0074937 A1 | 3/2016 | Nassar et al. | |
| 2016/0114425 A1 | 4/2016 | Liu | |
| 2016/0158889 A1 | 6/2016 | Carter et al. | |
| 2016/0332370 A1 | 11/2016 | Arai et al. | |
| 2017/0212979 A1 | 7/2017 | Cheng | |

FOREIGN PATENT DOCUMENTS

| | | | |
|---|---|---|---|
| CN | 104775116 A | 7/2015 | |
| CN | 105081573 A | 11/2015 | |
| CN | 105828985 A | 8/2016 | |
| EP | 0 429 196 A2 | 5/1991 | |
| EP | 0 609 772 A1 | 8/1994 | |
| EP | 2 221 132 A1 | 8/2010 | |
| EP | 2 620 240 A1 | 7/2013 | |
| EP | 2 926 925 A2 | 10/2015 | |
| EP | 2 933 044 A1 | 10/2015 | |
| GB | 2520596 A | 5/2015 | |
| GB | 2506494 B | 10/2016 | |
| JP | 2002-166481 A | 6/2002 | |
| JP | 2006-027085 A | 2/2006 | |
| JP | 2015-199197 A | 11/2015 | |
| JP | 2016-44338 A | 4/2016 | |
| JP | 2016-516888 A | 6/2016 | |
| JP | WO2014/010144 A1 | 6/2016 | |
| WO | 91/06378 A1 | 5/1991 | |
| WO | 98/48997 A1 | 11/1998 | |
| WO | 98/55257 A1 | 12/1998 | |
| WO | 2010/007396 A1 | 1/2010 | |
| WO | 2015/109102 A1 | 7/2015 | |
| WO | 2015/145844 A1 | 10/2015 | |
| WO | 2016/201326 A1 | 12/2016 | |

OTHER PUBLICATIONS

Jun. 29, 2015 Search Report issued in British Patent Application No. 1420717.9.
May 19, 2016 International Search Report issued in International Patent Application No. PCT/GB2015/053484.
May 19, 2016 Written Opinion of the International Searching Authority issued in International Patent Application No. PCT/GB2015/053484.
Feb. 23, 2017 Search Report issued in Great Britain Patent Application No. GB1701702.1.
Aug. 27, 2018 Office Action issued in Chinese Patent Application No. 201580074172.6.
Oct. 1, 2018 Office Action issued in European Patent Application No. 15 800 896.1.
Sames WJ et al., "The Metallurgy and processing science of metal additive manufacturing", International Materials Reviews, vol. 61, No. 5, Mar. 7, 2016, pp. 315-360.
Farshidianfar Mohammed H et al., "Real-time control of microstructure in laser additive manufacturing", The International Journal of Advanced Manufacturing Technology, Springer, London, vol. 82, No. 5, Jul. 1, 2015, pp. 1173-1186.
Bontha S et al., "Effects of process variables and size-scale on solidification microstructure in beam-based fabrication of bulky 3D structures", Materials Science and Engineering: A Elsevier, Amsterdam, NL, vol. 513-514, Jul. 15, 2009, pp. 311-318.
U.S. Appl. No. 15/527,676, filed May 17, 2017 in the name of McClelland et al.
U.S. Appl. No. 16/324,622, filed Feb. 11, 2019 in the name of Brochu.
Gockel, Joy etc. "Understanding Ti-6AI-4V Microstructure Control in Additive Manufacturing via Process Maps", pp. 1-9. <https: www.researchgate.netipublicationl 267901565_Process_Mapping_ oC Ti-6AI-4V Solidification Microstructure Across—Two—E-Beam-AM- Processes> saved on Dec. 31, 2012, searched on Aug. 25, 2021.
Mumtaz, K. A., and Neil Hopkinson. "Selective laser melting of thin wall parts using pulse shaping." Journal of Materials Processing Technology 210.2 (2010): 279-287. (Year: 2010).

* cited by examiner

ADDITIVE MANUFACTURING APPARATUS AND METHODS

This is a Continuation of application Ser. No. 15/527,676 filed May 17, 2017, which in turn is a National Stage Entry of International Application No. PCT/GB2015/053484 filed on Nov. 17, 2015, which claims priority to British Application No. 1420717.9 filed on Nov. 21, 2014. The disclosures of the prior applications are hereby incorporated by reference herein in its entirety.

FIELD OF INVENTION

This invention concerns additive manufacturing apparatus and methods in which layers of material are solidified in a layer-by-layer manner to form an object. The invention has particular, but not exclusive application, to selective laser solidification apparatus, such as selective laser melting (SLM) and selective laser sintering (SLS) apparatus.

BACKGROUND

Selective laser melting (SLM) and selective laser sintering (SLS) apparatus produce objects through layer-by-layer solidification of a material, such as a metal powder material, using a high energy beam, such as a laser beam. A powder layer is formed across a powder bed in a build chamber by depositing a heap of powder adjacent to the powder bed and spreading the heap of powder with a wiper across (from one side to another side of) the powder bed to form the layer. A laser beam is then scanned across areas of the powder layer that correspond to a cross-section of the object being constructed. The laser beam melts or sinters the powder to form a solidified layer. After selective solidification of a layer, the powder bed is lowered by a thickness of the newly solidified layer and a further layer of powder is spread over the surface and solidified, as required. An example of such a device is disclosed in U.S. Pat. No. 6,042,774.

Typically, the laser beam is scanned across the powder along a scan path. An arrangement of the scan paths will be defined by a scan strategy. U.S. Pat. No. 5,155,324 describes a scan strategy comprising scanning an outline (border) of a part cross-section followed by scanning an interior (core) of the part cross-section. Scanning a border of the part may improve the resolution, definition and smoothing of surfaces of the part.

It is known to use a continuous mode of laser operation, in which the laser is maintained on whilst the mirrors move to direct the laser spot along the scan path, or a pulsed mode of laser operation, in which the laser is pulsed on and off as the mirrors direct the laser spot to different locations along the scan path.

The strategy used for scanning a part can affect the thermal loads generated during the build and accuracy of the resultant solidified line of material.

Excessive, unrestrained thermal stresses created during the build causes warping and/or curling of the part being built. As solidified material cools, the temperature gradient across the cooling solidified material can cause warping and/or curling of the part. U.S. Pat. No. 5,155,324 and US2008/0241392 A1 describe scanning an area in a plurality of parallel scan paths (raster scan). The direction of the scan paths are rotated between layers to homogenise tensions generated during the build. US2008/0241392 A1 extends this concept to scanning in a series of parallel stripes, wherein each stripe consists of a plurality of parallel scan paths running perpendicular to a longitudinal direction of the stripe. The direction of the stripes are rotated by 67 degrees between layers.

US2005/0142024 discloses a scan strategy for reducing thermal loads comprising successively irradiating individual areas of a layer, which are at a distance from one another that is greater than or at least equal to a mean diameter of the individual areas. Each individual area is irradiated in a series of parallel scan paths.

A melt pool generated by the laser is dependent upon the properties of the material and the state (powder or solidified) and temperature of material surrounding the volume being melted. The scan strategy used can affect the state and temperature of the neighbouring material. For example, scanning of the laser spot along a scan path in continuous mode forms a large melt pool that is dragged along just behind the laser spot, resulting in larger, less detailed solidification lines. For some materials, such as tool steels and aircraft grade super alloys, it can be difficult to drag the melt pool across the layer in a continuous mode of operation of the laser. These problems can be mitigated by using the laser beam in the pulsed mode of operation. In particular, setting the time between pulses to be long enough to allow a previously formed melt pool to cool before forming an adjacent melt pool can result in more accurate solidification lines, which may be particularly beneficial for border scans. However, slowing the scans to this extent can significantly increase the time to scan that area/path and therefore, significantly increase the build time.

SUMMARY OF INVENTION

According to a first aspect of the invention there is provided an additive manufacturing apparatus comprising a build chamber, a build platform lowerable in the build chamber such that layers of flowable material can be successively formed across the build platform, a laser for generating a laser beam, a scanning unit for directing the laser beam onto each layer to selectively solidify the material and a processor for controlling the scanning unit.

The processor may be arranged to control the scanning unit to direct the laser beam to solidify a selected area of material by advancing the laser beam a plurality of times along a scan path, wherein on each pass long the scan path, the laser beam solidifies spaced apart sections of the scan path, each subsequent pass solidifying sections that are located between sections solidified on a previous pass.

The additive manufacturing apparatus may comprise a laser source for generating a plurality of laser beams, the scanning unit arranged for directing the laser beams onto each layer to selectively solidify the material, and the processor is arranged to control the scanning unit to direct the laser beams to solidify a selected area of material by consecutively advancing multiple ones of the laser beams along a scan path, wherein on a pass of each one of the laser beams along the scan path, the laser beam solidifies spaced apart sections of the scan path and a pass of one of the laser beams along the scan path solidifies sections that are located between sections of the scan path solidified by another of the laser beams.

The scan path may be a border scan path around a border of the selected area. Carrying out such scanning may increase the build time compared to forming a continuous solidification line along the scan path. Accordingly, for a core of the selected area it may be preferable to use a more efficient scanning strategy. However, at the borders of an area, highly accurate melting may be desired and a scanning method according to the invention may achieve increased accuracy along the border scans. However, in certain circumstances it may be desirable to use such a scanning strategy for the core of an area to be solidified. For example, for materials that are difficult to process with scanning strategies that solidify the material in large continuous lines (hatches), such as tool steels and aircraft grade super alloys, such a scanning strategy may also be used for a core of areas to be solidified.

A first pass of the laser beam along the scan path may be in a first direction and a subsequent pass, such as second pass, of the or another laser beam along the scan path may be in a second, opposite direction. For example, for a border scan, the first pass may be in a clockwise/anticlockwise direction around the border and the second pass may be in the other of the anticlockwise/clockwise direction.

The processor may be arranged to control the scanning unit to direct the laser beam to solidify a selected area of the material by solidifying sub-millimetre sized sections of the area non-continuously and in an order such that consecutively solidified sections are spaced apart.

In this way, whilst a section previously irradiated by the laser beam is allowed to solidify, a further section, spaced from the previously irradiated section, is irradiated with the laser beam. Accordingly, delays in solidification of the selected area are reduced compared to waiting for the previous section to solidify before irradiating the adjacent section whilst inaccuracies and thermal stresses formed by continuous scanning of large sections are avoided.

With such small sections, a more isotropic solidified section may be formed compared to longer sections. It will be understood that "sub-millimetre sized section" means that the all dimensions of the section are less than 1 mm.

Each section may be formed from irradiating a single point with the (static) laser beam or moving the laser beam across the layer, for example in the formation of a line. A size of the section may be set by the time it takes for the material to solidify. In one embodiment, the section may be sized such that irradiation of the section with the laser beam results in a melt pool extending across the entire section.

The processor may be arranged to control the scanning unit to direct the laser beam to solidify a selected area of the material by irradiating sections of the area with the laser beam such that each irradiated section is allowed to solidify before an adjacent section is irradiated with the or another laser beam.

Each section of a selected area of one layer may be arranged to (only) partially overlap with sections of a corresponding selected area of a previous layer. Each section may be a substantially round spot, the spots of each layer arranged in a regular pattern, wherein the pattern of one layer is offset relative to a corresponding pattern of the previous layer. The spots may be arranged in a triangular pattern. The spots of the pattern may be solidified in an order such that adjacent spots are not sequentially solidified.

Irradiation of the spots of the pattern with the or a plurality of laser beams may progress across the pattern in a direction different to a direction that irradiation of spots progressed (in a like manner) across a pattern in the corresponding selected area of the previous layer. For a triangular pattern, the direction in which irradiation of the spots progresses may be changed by 60 or 120 degrees between each layer.

According to a second aspect of the invention there is provided a method of scanning layers of material in a layer-by-layer additive manufacturing process, wherein successive layers of flowable material are formed across a build platform and a laser beam scanned across selected areas of each layer to solidify the material in the selected areas.

The method may comprise directing the laser beam to solidify a selected area of the material by solidifying sub-millimetre sized sections of the area non-continuously and in an order such that consecutively solidified sections are spaced apart.

The method may comprise directing the laser beam to solidify a selected area of material by advancing the laser beam a plurality of times along a scan path, wherein on each pass long the scan path, the laser beam solidifies spaced apart sections of the scan path, each subsequent pass solidifying sections that are located between sections solidified on a previous pass.

The method may comprise directing a plurality of laser beams to solidify a selected area of material by consecutively advancing multiple ones of the laser beams along a scan path, wherein on a pass of each one of the laser beams along the scan path, the laser beam solidifies spaced apart sections of the scan path and a pass of one of the laser beams along the scan path solidifies sections that are located between sections of the scan path solidified by another of the laser beams.

The method may comprise directing the laser beam to solidify a selected area of the material by irradiating sections of the area with the laser beam such that each irradiated section is allowed to solidify before an adjacent section is irradiated with the laser beam, wherein each section of a selected area of one layer is arranged to (only) partially overlap with sections of a corresponding selected area of a previous layer.

According to a third aspect of the invention there is provided a data carrier having instructions stored thereon, which, when executed by a processing unit of an additive manufacturing apparatus, cause the processing unit to control the additive manufacturing apparatus to carry out the method of the second aspect of the invention.

The data carrier of the above aspects of the invention may be a suitable medium for providing a machine with instructions such as non-transient data carrier, for example a floppy disk, a CD ROM, a DVD ROM/RAM (including −R/−RW and +R/+RW), an HD DVD, a Blu Ray™ disc, a memory (such as a Memory Stick™, an SD card, a compact flash card, or the like), a disc drive (such as a hard disc drive), a tape, any magneto/optical storage, or a transient data carrier, such as a signal on a wire or fibre optic or a wireless signal, for example a signals sent over a wired or wireless network (such as an Internet download, an FTP transfer, or the like).

DESCRIPTION OF EMBODIMENTS

Figure 1:
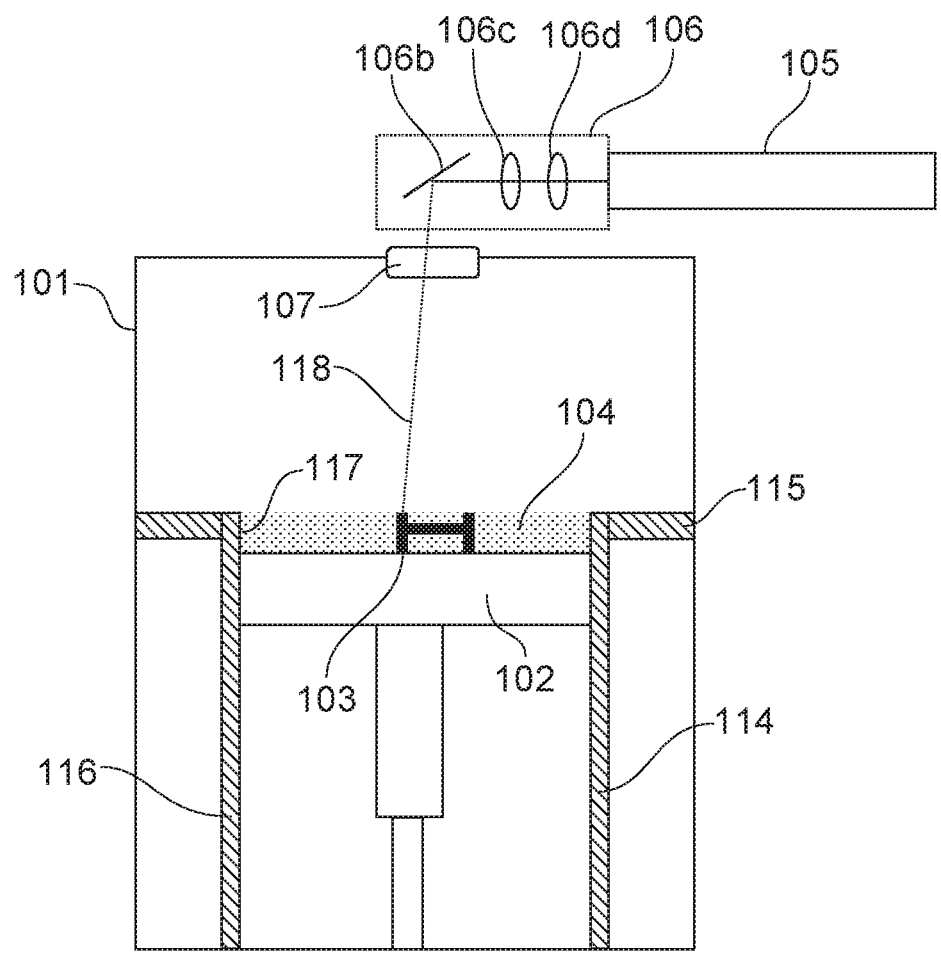
FIG. 1 is a schematic of a selective laser solidification apparatus according to an embodiment of the invention.
Figure 2:
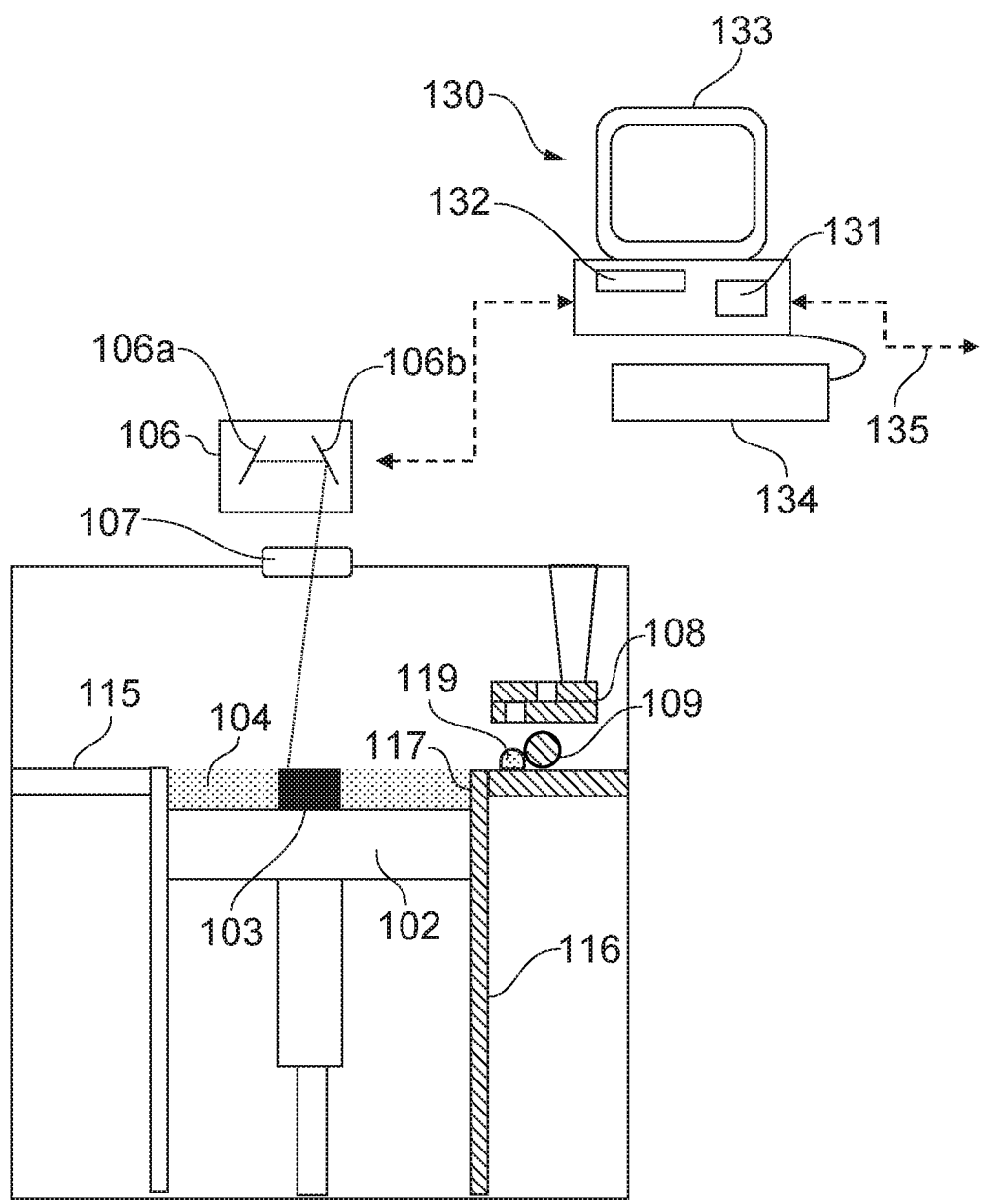
FIG. 2 is a schematic of the selective laser solidification apparatus from another side.

Referring to FIGS. 1 and 2, a laser solidification apparatus according to an embodiment of the invention comprises a main chamber 101 having therein partitions 115, 116 that define a build chamber 117 and a surface onto which powder can be deposited. A build platform 102 is provided for supporting an object 103 built by selective laser melting powder 104. The platform 102 can be lowered within the build chamber 117 as successive layers of the object 103 are formed. A build volume available is defined by the extent to which the build platform 102 can be lowered into the build chamber 117.

Layers of powder 104 are formed as the object 103 is built by dispensing apparatus 108 and an elongate wiper 109. For example, the dispensing apparatus 108 may be apparatus as described in WO2010/007396.

A laser module 105 generates a laser for melting the powder 104, the laser directed as required by optical scanner 106 under the control of a computer 130. The laser enters the chamber 101 via a window 107.

The optical scanner 106 comprises steering optics, in this embodiment, two movable mirrors 106a, 106b for directing the laser beam to the desired location on the powder bed 104 and focusing optics, in this embodiment a pair of movable lenses 106c, 106d, for adjusting a focal length of the laser beam. Motors (not shown) drive movement of the mirrors 106a and lenses 106b, 106c, the motors controlled by processor 131.

Computer 130 comprises the processor unit 131, memory 132, display 133, user input device 134, such as a keyboard, touch screen, etc, a data connection to modules of the laser melting unit, such as optical module 106 and laser module 105 and an external data connection 135. Stored on memory 132 is a computer program that instructs the processing unit to carry out the method as now described.

Processor receives via external connection 135 geometric data describing scan paths to take in solidifying areas of powder in each powder layer. To build a part, the processor controls the scanner 106 to direct the laser beam in accordance with the scan paths defined in the geometric data.

Figure 3A:
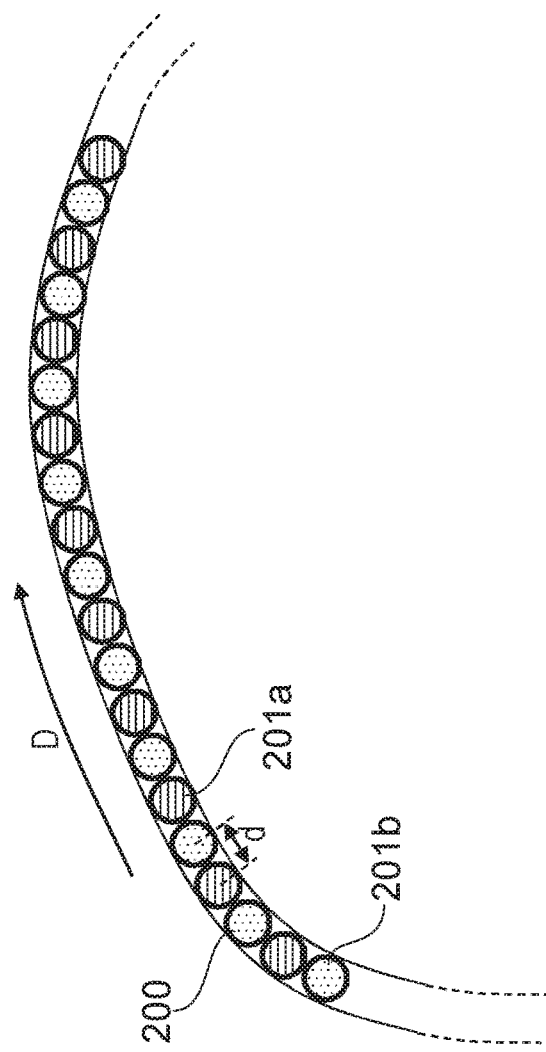
FIGS. 3a and 3b are schematic diagrams illustrating scans along a scan path.
Figure 3B:
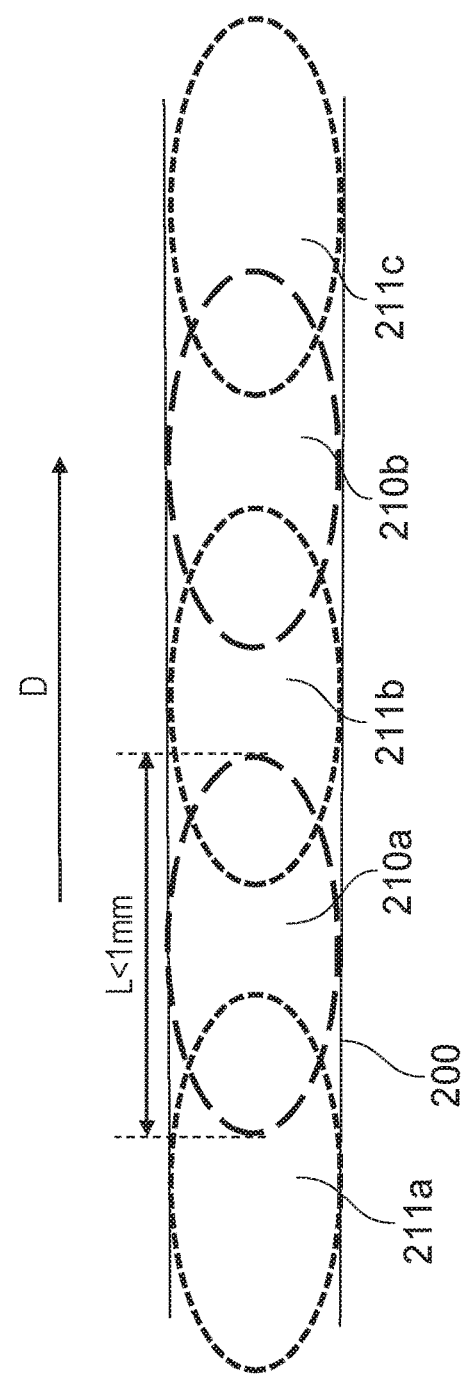

Referring to FIGS. 3a and 3b, in this embodiment, to perform a scan along a scan path, such as a border scan path 200, extending around an area of material to be solidified, the laser 105 and scanner 106 are synchronised to expose a series of discrete points 201 along the scan path 200 to the laser beam. For each scan path 200, a point distance, d, point exposure time and spot size is defined. A direction, D, in which the points 201 are scanned is also defined. In FIG. 3a, the border scan path 200 is scanned twice in the direction D, with spaced apart points 201a, shown in FIG. 3a with a horizontal line fill, exposed on a first pass of the laser beam along the scan path 200 and spaced apart point 201b, shown in FIG. 3a with a dotted fill, in between points 201a, exposed on a second pass along the scan path 200. In FIG. 3a the points 201 (melt pools formed by the laser beam) are shown as not overlapping for clarity but, in practical applications would at least slightly overlap such that a line of solidified material is formed along the scan path 200.

By successively solidifying every other point 201 along the scan path, the material melted at each point 201 is allowed to solidify before material at an adjacent point is solidified, during which time the laser beam melts material at other points 201. Allowing a melt formed at each point 201 to solidify separately may allow more accurate solidification lines to be formed. In particular, a melt front is not dragged around the scan path 200 by the laser beam, which can result in inaccuracies and epitaxial or columnar grain growth.

In the embodiment shown in FIG. 3a, when each point 201 is being irradiated by the laser beam, the laser beam spot is held substantially stationary at the point 201, forming a substantially spherical melt pool. However, as illustrated in FIG. 3b, some of the accuracy advantages may still be achieved by forming spaced apart elongate melt pools less than 1 mm in length though small movements of the laser beam spot across the powder bed before the laser beam is turned off and jumped to the next spaced apart section 210, 211 of a scan path 200 to be exposed. Forming elongate sections 210, 211 rather than discrete points 201 may be desirable in order to balance accuracy against efficiency.

It is believed that, for typical laser parameters used in selective laser melting, the laser beam can irradiate sections of less than 1 mm to form a melt pool extending across the entire length of the section. In this way, the solidified section 210. 211 will have few directional properties. Beyond 1 mm, the start of a section will solidify before an end of the section has been melted. Metal material typically solidifies within 0.1 to 1.66 µs. A speed of the laser beam is dictated by the energy that the laser beam can couple into the material within a unit period of time whilst at the same time avoiding excessive vaporisation of the material. For a 500 Watt laser focused to an 80 micron spot, the speed of the laser beam can be of the order of 2 to 500 m/s.

In FIG. 3b, in a first pass along the scan path 200, the laser beam irradiates spaced apart sections 210 and on a second pass of the scan path, the laser beam irradiates spaced apart section 211 that lie between sections 210.

In both FIGS. 3a and 3b, both the first pass and the second pass are in the same direction. However, in an alternative embodiment, the first pass and the second pass are in opposite directions. Furthermore, in yet another embodiment, the points or sections are spaced such that three of more passes have to be made along the scan path to form a continuous solidification line along the scan path.

Figure 4:
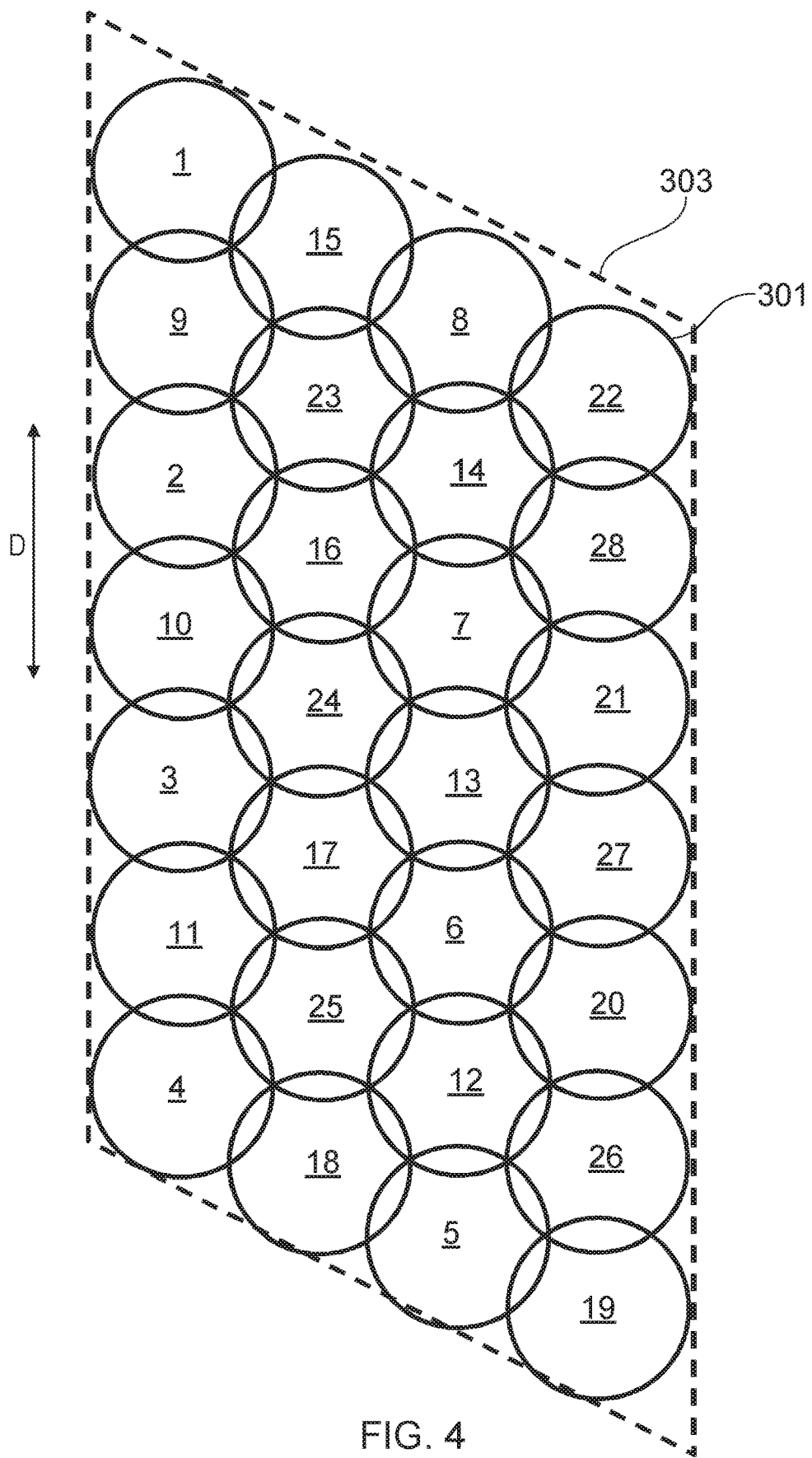
FIG. 4 is a schematic diagram illustrating a fill scan of an area in accordance with an embodiment of the invention.

FIG. 4 shows a further scan strategy according to an embodiment of the invention for solidifying a core of an area 303. Points 301 are irradiated by the laser beam to solidify area 303. The points 301 are arranged in a 2-dimensional triangular pattern and the laser irradiates the points in an order, indicated by numbers 1 through 28 such that successively irradiated points 301 are spaced apart and a point (or possibly points) between the successively irradiated points is (are) irradiated after the successively irradiated points have had time to solidify or irradiated and solidified before the successively irradiated points are irradiated.

In the order shown in FIG. 4, the points 301 are scanned along linear scan paths (each column of points 301) in one of two directions indicated by the arrow, D. Spaced apart points 301 in a first scan path (far left column) are scanned in a first direction (down the page) and then spaced apart points 301 in a second scan path (column second from the right) are scanned in a second, opposite direction (up the page). The laser beam then returns to the first scan path to scan the spaced apart points 301 located between the points 301 previously irradiated on the first pass along the first scan path. This continues for all scan paths (columns of points in direction, D) until the entire area 303 has been solidified.

It will be understood that like FIG. 3b, rather than points 301, the core may be filled with separately irradiated elongate sections. Furthermore, rather than each pass along a scan path being in the same direction, each pass along the scan path may be in opposite directions.

Figure 5:
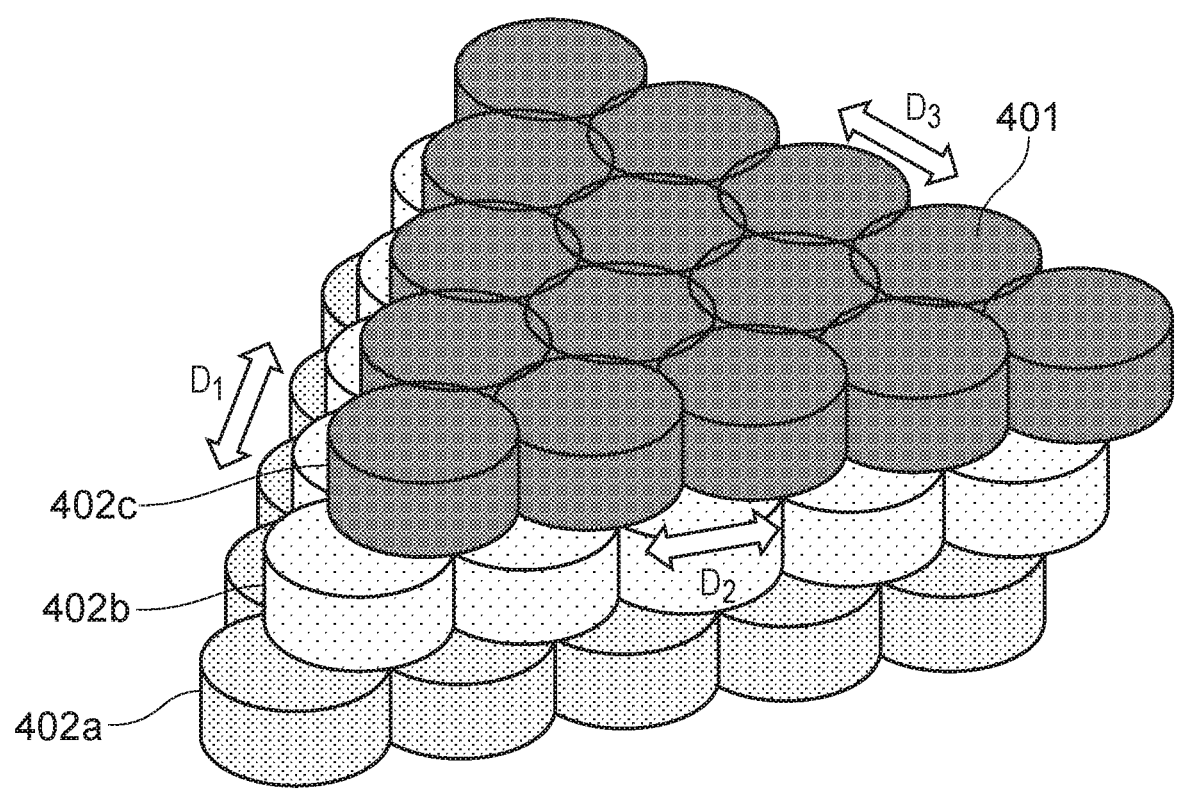
FIG. 5 is a schematic diagram illustrating the fill scan of FIG. 4 for multiple layers.

FIG. 5 shows the fill pattern for three successive layers 402a to 402c. The location of the points 401 for each layer 402a to 402c are offset relative to the adjacent layers such that the centres of the points 401 of adjacent layers do not coincide. The linear scan paths of points 401 for each layer 402a to 402c are scanned in directions as indicated by arrows $D_1, D_2, D_3$, the directions being rotated between each layer 402a to 402c. In this embodiment, the triangle pattern of the points 401 allows the directions to be rotated by 60 degrees between each layer.

Rather than progressing along linear scan paths in one of two opposed directions as described above, the scanning sequence for the triangular pattern of points 301, 401, shown in FIGS. 4 and 5 may progress with movement of the laser beam in orthogonal directions. In this way, successively irradiated points 301, 401 of the pattern are located apart in direction, D, and in a direction orthogonal to D.

Furthermore, the offset patterns shown in FIG. 5 may still provide benefits even with a scanning sequence in which adjacent points are successively irradiated.

It will be understood that alterations and modifications may be made to the above described embodiments without departing from the scope of the invention as defined herein. For example, the additive manufacturing apparatus may comprise a plurality of laser beams and scanning modules for independently steering each laser beam. In the embodiment shown in FIGS. 3a and 3b, each pass along the border scan path may be by the same or a different laser beam. In particular, a second laser beam may start scanning along the scan path before the first laser beam has completed scanning of the laser path, the two scans sufficiently spaced such that sections irradiated by the first laser beam have solidified by the time the second laser beam begins solidifying adjacent sections along the scan path. In the second embodiment shown in FIGS. 4 and 5, various scanning strategies could be used with multiple laser beams. The laser beams could be scanned along the same paths or alternatively, more complex scanning strategies could be used, wherein each laser beam is advanced along a different scan path (which may or may not overlap in part).

The invention claimed is:

1. An additive manufacturing apparatus comprising a build chamber, a build platform lowerable in the build chamber such that layers of flowable material can be successively formed across the build platform, a laser for generating a laser beam, a scanning unit comprising at least one rotatable mirror for directing the laser beam onto each layer to selectively solidify the material and a processor for controlling the scanning unit, the processor arranged to control the scanning unit to direct the laser beam to solidify a selected area of material by advancing the laser beam a plurality of times along a scan path through rotation of the rotatable mirror, wherein on each pass along the scan path, the laser beam solidifies spaced apart sections of the scan path, each subsequent pass solidifying sections that are located between sections solidified on a previous pass.

2. A laser melting additive manufacturing apparatus comprising:
    a build chamber;
    a build platform lowerable in the build chamber such that layers of powder can be successively formed across the build platform;
    a laser for generating a laser beam;
    a scanning unit for directing the laser beam onto each layer to selectively solidify powder; and
    a processor for controlling the scanning unit, the processor arranged to control the scanning unit to direct the laser beam to consolidate a selected area of a layer of the powder by melting sections of the area non-continuously and in an order such that consecutively melted sections are spaced apart, the melted sections disposed in a two-dimensional arrangement, wherein at least one of the melted sections comprise at least three adjacent sections,
    wherein the melted sections are sub-millimetre sized such that the melt pool extends across the entire melted section and each of the melted sections is allowed to solidify before an adjacent section is melted by irradiating the layer with the or another laser beam.

3. A laser melting additive manufacturing apparatus according to claim 2, wherein each section is formed from irradiating a single point with the laser beam.

4. A laser melting additive manufacturing apparatus according to claim 2, wherein each section is formed by moving the laser beam across the layer.

5. A laser melting additive manufacturing apparatus according to claim 2, wherein the two-dimensional arrangement of melted sections is a regular pattern.

6. A laser melting additive manufacturing apparatus according to claim 5, wherein the regular pattern is a triangular pattern.

7. A laser melting additive manufacturing apparatus according to claim 2, wherein the two-dimensional arrangement of melted sections solidify to form a core of an object.

8. A laser melting additive manufacturing apparatus according to claim 2, wherein the two-dimensional arrangement of melted sections comprises a fill scan pattern for forming a core of an object.

9. A laser melting additive manufacturing apparatus according to claim 2, wherein the sections of the layer are arranged such that a centre of each section is offset relative to centres of sections of the adjacent layers.

10. A method of scanning layers of powder in a layer-by-layer laser melting additive manufacturing process, wherein successive layers of powder are formed across a build platform and a laser beam scanned across selected areas of each layer to consolidate powder in the selected areas, the method comprising:
    directing the laser beam to melt a selected area of the layer by melting sections of the area non-continuously and in an order such that consecutively melted sections are spaced apart, the melted sections disposed in a two-dimensional arrangement, wherein at least one of the melted sections overlaps with at least three adjacent sections; and
    allowing each of the melted sections to solidify before directing the or another laser beam to melt an adjacent section of the layer,
    wherein the melted sections are sub-millimetre sized such that the melt pool extends across the entire melted section.

11. A method according to claim 10, wherein each section is formed from irradiating a single point with the laser beam.

12. A method according to claim 10, wherein each section is formed by moving the laser beam across the layer.

13. A method according to claim 10, wherein the two-dimensional arrangement of melted sections is a regular pattern.

14. A method according to claim 13, wherein the regular pattern is a triangular pattern.

15. A method according to claim 10, wherein the two-dimensional arrangement of melted sections solidify to form a core of an object.

16. A method according to claim 10, wherein the two-dimensional arrangement of melted sections comprises a fill scan pattern for forming a core of an object.

17. A method according to claim 10, wherein the sections of the layer are arranged such that a centre of each section is offset relative to centres of sections of the adjacent layers.

18. A data carrier having instructions stored thereon, which, when executed by a processing unit of an additive manufacturing apparatus, cause the processing unit to control the additive manufacturing apparatus to carry out the method of claim 10.

19. An additive manufacturing apparatus according to claim 1, wherein the scan path is a border scan path around a border of the selected area.

20. An additive manufacturing apparatus according to claim 1, wherein a first pass of the laser beam along the scan path is in a first direction and a subsequent pass, such as second pass, of the laser beam is along the scan path is in a second, opposite direction.

21. An additive manufacturing apparatus according to claim 1, wherein the processor is arranged to control the scanning unit to direct the laser beam/laser beams to solidify the selected area of the material by solidifying sub-millimetre sized sections of the area non-continuously and in an order such that consecutively irradiated sections are spaced apart.

22. An additive manufacturing apparatus comprising a build chamber, a build platform lowerable in the build chamber such that layers of flowable material can be successively formed across the build platform, a laser source for generating a plurality of laser beams, a scanning unit for directing the laser beams onto each layer to selectively solidify the material, the scanning unit comprising rotatable mirrors for directing the laser beams onto each layer, and a processor for controlling the scanning unit, the processor arranged to control the scanning unit to advance multiple ones of the laser beams along a scan path through rotation of the rotatable mirrors, wherein on a pass of each one of the laser beams along the scan path, the laser beam solidifies spaced apart sections of the scan path and a pass of one of the laser beams along the scan path solidifies sections that are located between sections of the scan path solidified by another of the laser beams.

23. An additive manufacturing apparatus according to claim 22, wherein the scan path is a border scan path around a border of the selected area.

24. An additive manufacturing apparatus according to claim 22, wherein a first pass of the laser beam along the scan path is in a first direction and a subsequent pass, such as second pass, of the or another laser beam is along the scan path is in a second, opposite direction.

25. An additive manufacturing apparatus according to claim 22, wherein the processor is arranged to control the scanning unit to direct the laser beam/laser beams to solidify the selected area of the material by solidifying sub-millimetre sized sections of the area non-continuously and in an order such that consecutively irradiated sections are spaced apart.

* * * * *